A. E. GLASS & J. M. DOWNER.
DYNAMO ELECTRIC MACHINE.
APPLICATION FILED MAY 2, 1914.

1,174,563.

Patented Mar. 7, 1916.

WITNESSES:

INVENTORS:
ALFRED E. GLASS,
JOHN M. DOWNER,
BY
THEIR ATTORNEY.

UNITED STATES PATENT OFFICE.

ALFRED E. GLASS AND JOHN M. DOWNER, OF SCHENECTADY, NEW YORK, ASSIGNORS TO GENERAL ELECTRIC COMPANY, A CORPORATION OF NEW YORK.

DYNAMO-ELECTRIC MACHINE.

1,174,563.     Specification of Letters Patent.     Patented Mar. 7, 1916.

Application filed May 2, 1914. Serial No. 835,858.

*To all whom it may concern:*

Be it known that we, ALFRED E. GLASS, a subject of the King of Great Britain, and JOHN M. DOWNER, a citizen of the United States, both residing at Schenectady, in the county of Schenectady, State of New York, have invented certain new and useful Improvements in Dynamo-Electric Machines, of which the following is a specification.

Our invention relates to improvements in dynamo electric machines and particularly to improvements in the construction of alternating current machines provided with a short-circuited winding.

In alternating current generators or synchronous motors designed for relatively high speeds, it is the practice to support the field coils against displacement by centrifugal force, by means of plates or rings which are mounted on the revolving field spiders, and which near their outer peripheries are connected to supporting members mounted on the outer face of the field coils. It is customary to utilize these supporting rings for the double purpose of short-circuiting the copper bars comprising the amortisseur winding of such machines, by rigidly connecting the bars to the rings, and considerable difficulty, especially in machines of large sizes, has been experienced by the buckling or rupturing of the bars due to expansion and ultimate contraction of the bars, because of heating during operation.

Our invention provides means for connecting the conductor bars to the short-circuiting rings in a manner to avoid harmful results from the expansion or contraction of the conductor bars.

The various features of novelty which characterize our invention are pointed out with particularity in the claims annexed to and forming a part of this specification.

For a better understanding of our invention, reference may be had to the accompanying drawing and descriptive matter, in which we have illustrated and described our invention as embodied in a synchronous motor, although the invention is suitable for use in other types of dynamo electric machines.

Figure 1:
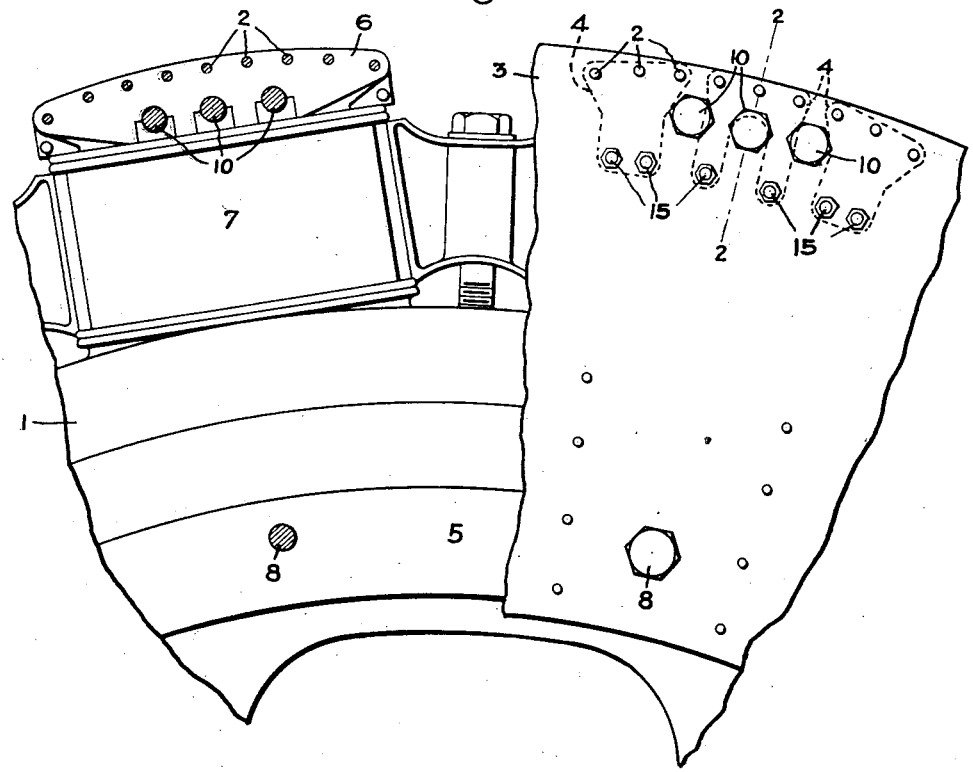
Figure 2:
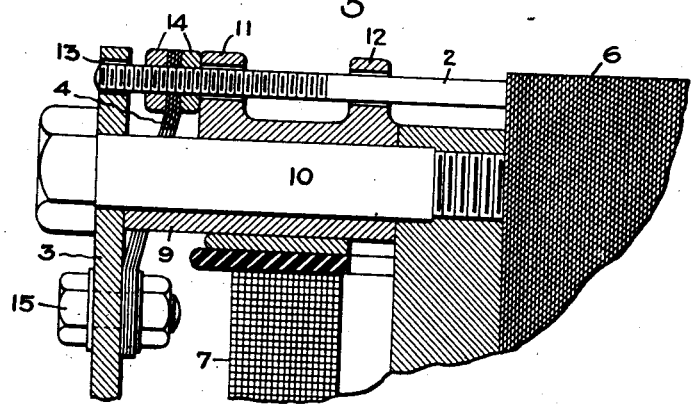

In the drawing, Figure 1 shows an end elevation of a portion partly in section of the rotor of a synchronous motor arranged in accordance with our invention; and Fig. 2 shows an enlarged section taken on line 2—2 in Fig. 1.

Referring to the drawing, 1 is a rotatable member of an alternating current dynamo electric machine; 2 indicates the conductor bars of an amortisseur winding mounted in the member 1; 3 is a ring for short-circuiting the conductor bars 2, and is fastened at its inner periphery to the rotatable member. 4 indicates flexible members for connecting the bars 2 to the ring 3.

In our preferred construction, as illustrated, each of the flexible members 4 connects a plurality of conductor bars 2 to the ring 3, although separate flexible members may be provided for each conductor bar.

The rotatable member 1 comprises a spider 5 on which is mounted the core or pole member 6, on which, in turn, is mounted the field coil 7. The ring 3 is secured to the spider 5 by means of bolts 8. The outer edge of the ring 3 is spaced from the core or pole member 6 by the supporting or spacing member 9 mounted on the outer face of the field coil 7, and is secured to the end plate of the core or pole member 6 by bolts 10 which pass through the member 9, and thereby supports the field coil against displacement by centrifugal force. The conductor bars 2 pass freely through projections 11 and 12 on the member 9 and are supported thereby against distortion due to centrifugal stresses. As shown in the drawing, the end ring 3 is provided with apertures 13 into or through which the conductor bars 2 may extend. The flexible members 4 are clamped between two nuts 14 threaded on each bar between the end ring 3 and projections 11 of the spacing member 9, and spaced from the end member 3 as illustrated in Fig. 2 to allow for longitudinal expansion of the conductor bars 2. The flexible members 4 are illustrated as being connected to the end ring by means of the bolts 15, although this connection may be made in any way desired.

Although we have shown the supporting members 9 and the ring 3 as separate members, it is obvious that they may be made integral, and we aim in the appended claims to cover such a modification, as well as any other modifications which do not depart from the spirit and scope of our invention.

What we claim as new and desire to secure by Letters Patent of the United States, is:—

1. In an alternating current dynamo electric machine, a rotatable member, conductor bars mounted in the member, a ring for short-circuiting the conductor bars, means for fastening said ring to the rotatable member, and a plurality of flexible members, each of said flexible members connecting a plurality of conductor bars to the ring.

2. In an alternating current dynamo electric machine, a rotatable member, conductor bars mounted in the member, a ring for short-circuiting said conductor bars, means for fastening said ring to the rotatable member, a spacing member, said conductor bars passing freely through said spacing member and being supported thereby against centrifugal force, a plurality of flexible members, means for connecting each of said flexible members to a conductor bar, said last mentioned means being spaced away from said ring so as to allow for longitudinal expansion of said conductor bars, and means for fastening the flexible members to the ring.

3. In an alternating current dynamo electric machine, a rotatable member, conductor bars mounted in said member, a ring for short-circuiting said conductor bars, means for fastening said ring to the rotatable member, a plurality of flexible conducting members, each of said flexible conducting members being fastened to a plurality of conductor bars and spaced from said ring to allow for longitudinal expansion of said conductor bars, and means for fastening the flexible conducting members to the ring.

4. In an alternating current dynamo electric machine, a rotor body, a core member mounted on the rotor body, conductor bars mounted in the core member, a ring fastened to the rotor body for short-circuiting the conductor bars, a spacing member between the core member and said ring, the conductor bars passing freely through said spacing member, a plurality of flexible members, a nut connecting each of the flexible members to a conductor bar and threaded upon the conductor bars between said ring and said spacing member, the nuts being spaced away from said ring so as to allow for longitudinal expansion of the conductor bars, and means for fastening the flexible members to the ring.

5. In an alternating current dynamo electric machine, a rotor body, a core member on the rotor body, conductor bars mounted in the core member, a ring fastened to the rotor body for short-circuiting the conductor bars, a spacing member between the core member and said ring, the conductor bars passing freely through a portion of said spacing member, two nuts threaded upon each of the conductor bars between the ring and said portion of the spacing member, said nuts being spaced away from the ring so as to allow for longitudinal expansion of the conductor bars, and a plurality of flexible members, each of said flexible members being connected to a plurality of conductor bars and held between said nuts on each conductor bar, and means for fastening each of the flexible members to the ring.

6. In an alternating current dynamo electric machine, a rotor body, pole pieces on the rotor body, field coils on said pole pieces, a supporting member for each field coil, a ring fastened to the rotor body and spaced from the field coils by said supporting members, means for fastening the ring and the supporting members to the pole pieces, conductor bars mounted in the pole pieces and passing freely through the supporting members, two nuts threaded upon each of the conductor bars between the supporting members and said ring, the nuts being spaced from the ring to allow for longitudinal expansion of the conductor bars, and a plurality of flexible members, each of said flexible members being connected to a plurality of conductor bars and held between said nuts on each conductor bar, and means for fastening each of the flexible members to the ring.

In witness whereof, we have hereunto set our hands this first day of May, 1914.

ALFRED E. GLASS.
JOHN M. DOWNER.

Witnesses:
HELEN ORFORD,
MARGARET E. WOOLLEY.